Patented Feb. 21, 1950

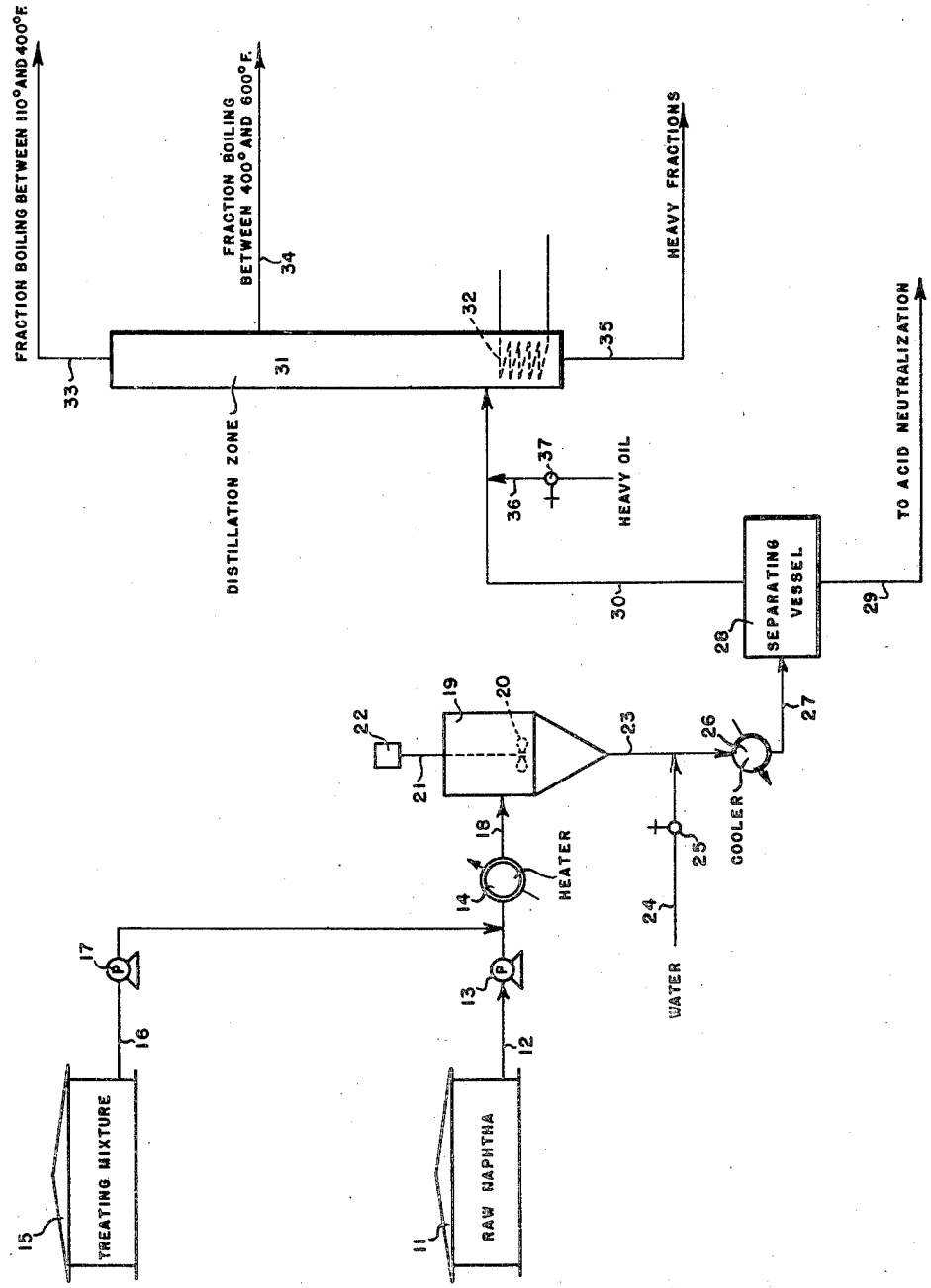

2,497,967

UNITED STATES PATENT OFFICE 2,497,967

REMOVAL OF OXYGENATED COMPOUNDS FROM SYNTHETIC NAPHTHAS

Edward F. Wadley, Baytown, Tex., assignor, by mesne assignments, to Standard Oil Development Company, Elizabeth, N. J., a corporation of Delaware Application December 17, 1947, Serial No. 792,249

8 Claims. (Cl. 260—450)

The present invention is directed to a method for removing oxygenated organic compounds from hydrocarbons containing them. More particularly, the invention is directed to the treatment of hydrocarbons obtained by reacting carbon monoxide and hydrogen in the presence of a catalyst.

The pioneering work by Fischer and Tropsch resulted in a process for producing hydrocarbons and oxygenated organic compounds from carbon monoxide and hydrogen by passing a mixture thereof over a suitable catalyst to cause a reaction between the materials. As a result of this work commercial processes have been developed to produce hydrocarbons and oxygenated organic compounds from carbon monoxide and hydrogen. The product from this synthesis reaction is a synthetic crude petroleum, but, unlike natural crude petroleum, it may contain a considerable quantity of oxygenated organic compounds such as ketones, aldehydes, organic acids, esters, and various other oxygenated hydrocarbon derivatives. These oxygenated organic compounds in themselves are valuable materials, but, in combination with hydrocarbons, they are objectionable since the hydrocarbons are contaminated by the oxygenated organic compounds and, therefore, are unsuitable for use in the various petroleum conversion processes where catalysts are employed.

The reason that the synthetic hydrocarbons produced by the reaction of carbon monoxide and hydrogen and contaminated with oxygenated organic compounds are unsuitable in catalytic conversion process is that the oxygenated organic compounds react with the catalyst usually employed, such as the Friedel-Crafts type catalyst. Not only do the oxygenated organic compounds react with the catalyst but they enter into reaction with the hydrocarbons and produce products of less attractive nature than the product resulting from the catalytic conversion of the hydrocarbons themselves. For example, polymers having lubricating oil qualities may be produced by polymerizing alpha olefins in the presence of aluminum chloride, but, if these alpha olefins are contaminated with oxygenated organic compounds, as when produced from carbon monoxide and hydrogen, the product is not satisfactory in that the lubricating oil qualities are depreciated by the presence of the oxygenated organic compounds. Furthermore, the oxygenated organic compounds react with the catalyst and destroy its activity requiring considerably larger quantities of catalysts to cause the reaction to proceed than would be required if the oxygenated organic compounds were absent.

The problem of removing oxygenated organic compounds from naphthas formed by the reaction of carbon monoxide and hydrogen has long been recognized and numerous suggestions have been made for removing these compounds. The prior art proposals have included treatment of the naphthas with an adsorbent such as silica gel, solvent extraction with aqueous methanol, and various other solvents such as sulfur dioxide and the like and mixtures thereof. It has also been suggested to remove a portion of the oxygenated organic compounds by treatment of the naphtha with various chemical reagents. The prior art proposals have largely been unsatisfactory in that, while they are effective in removing a portion of the oxygenated organic contaminants in the naphtha, they are largely ineffective in substantially completely removing the oxygenated organic compounds.

In a prior application filed November 28, 1947 for Boyd N. Hill and Edward F. Wadley entitled "Treatment of synthetic naphtha," U. S. Serial No. 788,632, it has been disclosed that a treating reagent comprising oil, alkali metal sulfonates and alkali metal hydroxide may be used to remove oxygenated organic compounds from hydrocarbons containing them by distillation of the contaminated hydrocarbon over the treating reagent at an elevated temperature. This process is very effective in removing oxygenated organic compounds such as alcohols, aldehydes, acids, esters, and ketones, but has one disadvantage in that the treating mixture, after use, has a tendency to solidify unless the temperature is maintained at an elevated degree and unless the treating solution is diluted with water or other aqueous material.

In accordance with the present invention, the disadvantages of the prior art processes are eliminated and a process is provided whereby hydrocarbons contaminated with oxygenated organic compounds may be treated with the aforementioned reagent without difficulty due to solidification thereof.

It is, therefore, the main object of the present invention to provide a process for removing oxygenated organic compounds from naphthas containing them by contacting the contaminated naphtha with a mixture of alkali metal sulfonate, oil, and alkali metal hydroxide at an elevated temperature.

Another object of the present invention is to provide a method for treating hydrocarbons containing oxygenated organic compounds as contaminants and olefins whereby the content of oxygenated organic compounds is substantially reduced and the hydrocarbons including the olefins are made suitable for employment in catalytic conversion operations.

A further object of the present invention is to disclose a process whereby a hydrocarbon mixture containing the various olefins and oxygenated organic compounds including ketones is treated such that the content of oxygenated organic compounds including ketones is substantially reduced and the olefin made suitable as a feed for producing synthetic lubricant polymers.

The objects of the present invention are obtained by subjecting hydrocarbons such as a synthetic crude petroleum obtained by the reaction of carbon monoxide and hydrogen over an iron-type catalyst to contact at an elevated temperature in the range between 300° to 650° F. with a treating mixture including oil, an alkali metal sulfonate, and an alkali metal hydroxide to cause substantial removal of oxygenated organic compounds, followed by diluting the admixture of hydrocarbons and treating reagent with water or an aqueous solution and then cooling the mixture to which water or aqueous solution has been added to a temperature in the range between 80° and 400° F. to cause phase separation. An aqueous phase and a hydrocarbon phase results which are separately removed and the hydrocarbon phase subjected to distillation conditions to obtain fractions substantially free of oxygenated organic compounds including ketones and which are suitable for employment in catalytic conversion operations.

The treating mixture employed in the present invention will usually comprise an oil boiling in the lubricating oil boiling range, an alkali metal sulfonate such as a sodium sulfonate produced by sulfonation of a solvent extract of a lubricating oil fraction and subsequent neutralization thereof, and an alkali metal hydroxide such as sodium hydroxide.

The alkali metal hydroxide is preferably sodium hydroxide, but potassium and lithium hydroxides may be substituted therefor.

The alkali metal sulfonate is preferably a sodium sulfonate, but, like the alkali metal hydroxide, may be potassium sulfonate or lithium sulfonate and under some conditions ammonium sulfonates may be satisfactory.

The oil forming a portion of the treating mixture is preferably an oil boiling in the lubricating oil boiling range and may be a solvent extract of a lubricating oil fraction.

The sulfonates, as mentioned before, may be formed by sulfonation and subsequent neutralization of a solvent extract of a lubricating oil fraction, but may also be formed by sulfonation and subsequent neutralization of alkyl aromatics, which, in turn, may be produced by alkylation of aromatic hydrocarbons such as toluene and benzene with high molecular weight olefins having more than five carbon atoms in the side chain.

A satisfactory treating reagent may be obtained by treatment of a solvent extract such as a phenol extract of a lubricating oil fraction with strong sulfuric acid to cause sulfonation of the aromatic constituents contained therein followed by separation of the sludge and neutralization of the oil layer containing sulfonated derivatives with sodium hydroxide to form a mixture containing oil, sodium sulfonates, and a small amount of sodium hydroxide. To this mixture is added an amount of sodium hydroxide sufficient to provide an amount of sodium hydroxide between about 10 to 50 weight per cent of the mixture. While such a treating reagent may be formed by employing an excess of sodium hydroxide in the neutralization, it is to be understood that the treating reagent may be formed by compounding lubricating oil fractions, sodium sulfonates from any source, and sodium hydroxide.

The treating reagent, prior to the addition of the sodium hydroxide, should contain an amount of oil such as a lubricating oil fraction or a solvent extract of a lubricating oil fraction in the range from about 75% to 90% and the alkali metal sulfonate, such as sodium sulfonate, should be present in the mixture prior to the addition of the alkali metal hydroxide in an amount in the range between 10% and 25%. Such a mixture is readily formed by sulfonation of a solvent extract, such as a phenol extract, with strong sulfuric acid, followed by neutralization of the oily layer with sodium hydroxide. A base treating mixture which has given good results, after addition of sodium hydroxide, comprises about 90% unsulfonated phenol extract and about 10% sodium sulfonates.

The invention will now be described and illustrated by reference to the drawing in which the sole figure presents a flow sheet of a preferred mode of practicing the invention.

Referring now to the drawing, numeral 11 designates a charge tank containing a substantially debutanized raw naphtha which has been obtained from the synthesis of carbon monoxide and hydrogen over an iron-type catalyst. The raw naphtha in tank 11 is withdrawn by line 12 and pumped by pump 13 into a heater 14 where its temperature is raised to a temperature in the range between 300° and 650° F. There is injected into the raw naphtha in line 12 a treating mixture comprising oil, such as a lubricating oil or a solvent extract of a lubricating oil, alkali metal sulfonate, such as sodium sulfonate, and an alkali metal hydroxide, such as sodium hydroxide, which is withdrawn from tank 15 by line 16, and pump 17 and discharged into line 12 whence it is admixed with the raw naphtha and flows therewith into heater 14 where the temperature of the admixture is raised to a temperature in the range given. The admixture in a heated condition on passage through heater 14 then discharges by line 18 into a mixing vessel 19 equipped with a stirring device 20 which is actuated through shaft 21 by prime mover 22 which suitably may be an electric motor or other similar propelling mechanism. The mixture of raw naphtha and treating reagent in vessel 19 is contacted intimately by actuation of agitating means 20 for a period of time in the range from about one-quarter to twelve hours during which time a substantially complete reaction takes place between the oxygenated organic compounds and other contaminating materials in the raw naphtha and the treating reagent. Following this treating time the mixture in vessel 19 is withdrawn by line 23 and has added to it water or other aqueous medium which is introduced by line 24 and which is controlled by valve 25. The diluted mixture is then cooled by passage through cooler 26 to a temperature in the range between 80° and 400° F. and then discharged by line 27 into a separating vessel 28 which is of sufficient capacity to allow a residence time for separation of the diluted mixture into an oil phase and an aqueous phase.

The aqueous phase contains products of the contaminating oxygenated bodies in the original raw naphtha and it may be discharged by line 29 for removal from the system or for recovery of any valuable materials contained therein by acidification with a mineral acid.

The oil phase is removed from separator 28 by line 30 and is routed thereby into a distillation zone 31. Distillation zone 31 is shown as a single fractionation tower for convenience. However, it is to be understood that distillation zone 31 may include a plurality of distillation towers equipped with suitable internal contacting means such as bell cap trays and the like to allow intimate contact between vapors and liquids. Distillation zone 31 is provided with a heating means illustrated by coil 32 to allow adjustments of temperature and pressures therein and to allow removal from the treated naphtha a fraction boiling between 110° and 400° F. by line 33, a fraction boiling between 400° and 600° F. by line 34, and a heavy bottoms fraction, including polymers of the dienes and products of aldol condensation by line 35, which are of higher boiling points than the lighter fractions removed by lines 33 and 34.

It may be desirable to inject into the treated hydrocarbon flowing through line 30, a high boiling lubricating oil fraction to provide a sufficient amount of fluid in the fractionating tower to allow recovery of substantially all of the treated hydrocarbon. To this end there may be injected by line 36 a fraction boiling in the lubricating oil boiling range by opening valve 37 therein connecting line 30 to a source of heavy oil not shown. By providing a heavy oil as described, it may be possible to distill and recover as much as 95% of the treated naphtha.

It will be apparent from the foregoing description that a process has been provided in which oxygenated organic compounds may be removed from hydrocarbons containing them by treatment with a mixture, at an elevated temperature, of oil, an alkali metal sulfonate and an alkali metal hydroxide. In accordance with the process of the present invention, the danger of solidification of the treating reagent at temperatures approaching atmospheric are substantially eliminated by contacting the naphtha with the treating reagent at an elevated temperature and diluting the admixture of treating reagent and naphtha with an aqueous medium prior to cooling the mixture for phase separation.

The nature and objects of the present invention having been completely described and illustrated, what I wish to claim as new and useful and to secure by Letters Patent is:

1. A method for removing oxygenated organic compounds from a hydrocarbon fraction containing them which comprises subjecting a hydrocarbon fraction containing alcohols, aldehydes, organic acids, esters and ketones to contact with a treating reagent comprising a hydrocarbon fraction boiling in the lubricating oil boiling range, an alkali metal sulfonate and an alkali metal hydroxide at an elevated temperature substantially above atmospheric for a time sufficient for reaction of said treating reagent with said oxygenated compounds to form a reaction mixture, diluting the reaction mixture with an aqueous medium, cooling the diluted reaction mixture, separating the cooled reaction mixture into an oil phase and a water phase, and recovering from said oil phase a hydrocarbon fraction substantially free of oxygenated compounds.

2. A method for removing oxygenated organic compounds from a hydrocarbon fraction contaminated with them which comprises subjecting a contaminated hydrocarbon fraction containing alcohols, aldehydes, organic acids, esters and ketones to contact with a treating reagent comprising a hydrocarbon fraction boiling in the lubricating oil boiling range, an alkali metal sulfonate, and an alkali metal hydroxide at a temperature in the range between 300° and 650° F. and for a time in the range between one-quarter and twelve hours to form a reaction mixture, diluting the reaction mixture with an aqueous medium, cooling the diluted reaction mixture to a temperature in the range between 80° and 400° F., separating the cooled reaction mixture into an oil phase and a water phase and recovering from said oil phase a hydrocarbon fraction substantially free of oxygenated compounds.

3. A method for treating a naphtha fraction obtained by synthesis from carbon monoxide and hydrogen over an iron-type catalyst and containing contaminating bodies including alcohols, aldehydes, organic acids, esters and ketones which comprises forming a mixture of said naphtha with a treating reagent including a hydrocarbon fraction boiling in the lubricating oil boiling range, an alkali metal sulfonate, and an alkali metal hydroxide, heating the admixture to an elevated temperature substantially above atmospheric for a time sufficient for reaction of the contaminating bodies in said naphtha, diluting the reaction mixture with an aqueous medium, cooling the diluted reaction mixture, separating the cooled reaction mixture into an oil phase and an aqueous phase and recovering from said oil phase a hydrocarbon fraction substantially free of contaminating compounds.

4. A method for treating a naphtha fraction obtained by synthesis from carbon monoxide and hydrogen over an iron-type catalyst and containing contaminating bodies including alcohols, aldehydes, organic acids, esters and ketones which comprises forming a mixture of said naphtha with a treating reagent including a hydrocarbon fraction boiling in the lubricating oil boiling range, an alkali metal hydroxide, heating the admixture to a temperature in the range between 300° and 650° F. for a time in the range between one-quarter and twelve hours, diluting the reaction mixture with an aqueous medium, cooling the diluted reaction mixture to a temperature in the range between 80° and 400° F., separating the cooled reaction mixture into an oil phase and an aqueous phase and recovering from said oil phase a hydrocarbon fraction substantially free of contaminating compounds.

5. A method in accordance with claim 4 in which the treating reagent comprises a solvent extract of a lubricating oil fraction, sodium sulfonate and sodium hydroxide.

6. A method in accordance with claim 4 in which the treating reagent comprises a hydrocarbon fraction boiling in the lubricating oil boiling range and alkali metal sulfonate in which the ratio of the hydrocarbon fraction boiling in the lubricating oil boiling range to the alkali metal sulfonate is in the range from 3:1 to 9:1, and the alkali metal hydroxide is in the range from 10 to 50 weight per cent of the treating reagent.

7. A method for treating a naphtha fraction obtained by synthesis from carbon monoxide and hydrogen over an iron-type catalyst and containing contaminating bodies including alcohols, aldehydes, organic acids, esters and ketones, which comprises forming a mixture of said naphtha with a treating reagent which comprises a solvent extract of a lubricating oil fraction and sodium sulfonate in a ratio in the range between 3:1 and 9:1 to which has been added sodium hydroxide in an amount sufficient to provide sodium hydroxide in the treating reagent in the range between 10 and 50 per cent by weight, heating the admixture to a temperature in the range between 300° and 650° F. for a time in the range between one-quarter and twelve hours, diluting the reaction mixture with an aqueous medium, cooling the diluted reaction mixture to a temperature in the range between 80° and 400° F., separating the cooled reaction mixture into an oil phase and an aqueous phase and recovering from said oil phase a hydrocarbon fraction substantially free of contaminating compounds.

8. A method in accordance with claim 7 in which the aqueous medium is water and the hydrocarbon fraction substantially free of contaminating compounds is recovered by distillation.

EDWARD F. WADLEY.

REFERENCES CITED

The following references are of record in the file of this patent:

UNITED STATES PATENTS

| Number | Name | Date |
| --- | --- | --- |
| 1,233,700 | Petroff | July 17, 1917 |
| 1,704,732 | Eisenhut | Mar. 12, 1929 |

FOREIGN PATENTS

| Number | Country | Date |
| --- | --- | --- |
| 542,616 | Germany | Jan. 27, 1932 |